United States Patent
Nishimiya (10) Patent No.: US 8,117,491 B2
(45) Date of Patent: Feb. 14, 2012

(54) DISK-DRIVE DEVICE AND METHOD FOR ERROR RECOVERY THEREOF

(75) Inventor: Hiromi Nishimiya, Kanagawa (JP)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 218 days.

(21) Appl. No.: 12/503,792

(22) Filed: Jul. 15, 2009

(65) Prior Publication Data

US 2010/0017683 A1   Jan. 21, 2010

(30) Foreign Application Priority Data

Jul. 15, 2008  (JP) ................................. 2008-184345

(51) Int. Cl.
  *G06F 11/00* (2006.01)
(52) U.S. Cl. .......................................... 714/6.11; 714/54
(58) Field of Classification Search ........................ None
  See application file for complete search history.

(56) References Cited

U.S. PATENT DOCUMENTS

| 5,610,808 A * | 3/1997 | Squires et al. .................... 700/2 |
| 6,611,392 B1 * | 8/2003 | Hasebe ............................ 360/53 |
| 6,721,494 B1 | 4/2004 | Kanno et al. |
| 6,829,206 B1 * | 12/2004 | Watanabe .................. 369/53.35 |

FOREIGN PATENT DOCUMENTS

| JP | 2001084712 | 3/2001 |
| JP | 2001249770 | 9/2001 |

* cited by examiner

*Primary Examiner* — Scott Baderman
*Assistant Examiner* — Jason Bryan (57) ABSTRACT

A method for an error recovery process in a disk-drive device. The method includes starting the error recovery process in response to an error which has occurred in a process corresponding to a command from a host to access a disk. The method also includes receiving a new read command from the host during the error recovery process. In addition, the method includes interrupting the error recovery process in accordance with preset conditions and reading out data from the disk at an address designated by the read command. Furthermore, the method includes transferring the read-out data to the host.

16 Claims, 3 Drawing Sheets

DISK-DRIVE DEVICE AND METHOD FOR ERROR RECOVERY THEREOF

CROSS-REFERENCE TO RELATED APPLICATION

This application claims priority from the Japanese Patent Application No. 2008-184345, filed Jul. 15, 2008, the disclosure of which is incorporated herein in its entirety by reference.

TECHNICAL FIELD

Embodiments of the present invention relate to a disk-drive device and a method for error recovery process thereof.

BACKGROUND

Disk-drive devices using various kinds of disks, such as optical disks, magneto-optical disks, and flexible magnetic-recording disks are known in the art. In particular, hard-disk drives (HDDs) are widely used as computer storage devices and are indispensable for contemporary computer systems. Moreover, the HDDs have found widespread use for video recording and reproducing equipment, car navigation systems, cellular phones, and similar devices, in addition to computers, due to their outstanding information storage capabilities.

A HDD transmits data to a host in response to a read command from the host within a specified time. In particular, HDDs for audio-visual (AV) devices read out data in a relatively short time. For good performance, AV equipment avoids interruptions in video and audio signals to prevent such interruptions from being perceived as an equipment failure. Therefore, minimizing delays in the transfer of read data provided by an HDD to a host, for example, a main controller of an AV device, is an area drawing much attention in research and development of HDD applications to AV equipment.

SUMMARY

Embodiments of the present invention include a method for an error recovery process in a disk-drive device. The method includes starting the error recovery process in response to an error which has occurred in a process corresponding to a command from a host to access a disk. The method also includes receiving a new read command from the host during the error recovery process. In addition, the method includes interrupting the error recovery process in accordance with preset conditions and reading out data from the disk at an address designated by the read command. Furthermore, the method includes transferring the read-out data to the host.

DESCRIPTION OF THE DRAWINGS

The accompanying drawings, which are incorporated in and form a part of this specification, illustrate embodiments of the invention and, together with the description, serve to explain the embodiments of the present invention.

The drawings referred to in this description should not be understood as being drawn to scale except if specifically noted.

DESCRIPTION OF EMBODIMENTS

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following description of embodiments of the present invention, numerous specific details are set forth in order to provide a thorough understanding of the present invention. However, it should be noted that embodiments of the present invention may be practiced without these specific details. In other instances, well known methods, procedures, and components have not been described in detail as not to unnecessarily obscure embodiments of the present invention. Throughout the drawings, like components are denoted by like reference numerals, and repetitive descriptions are omitted for clarity of explanation if not necessary. Description of Embodiments of the Present Invention for a Disk-Drive Device and a Method for Error Recovery Thereof In accordance with embodiments of the present invention, many AV devices use streaming commands for read operations of audio/video signals. Streaming commands can designate a continuous mode as distinct from other advanced technology attachment (ATA) commands. In the continuous mode, even if a read error occurs, an HDD proceeds to the next read operation without carrying out an error recovery process (ERP). A host is capable of specifying the mode in a field of a read command. An HDD carries out a read operation without performing the ERP, in the case of a read command designating the continuous mode.

In accordance with embodiments of the present invention, as correct data is not transferred to the host for a sector with a read error, a slight "skip," a term of art that refers to lost information, similar to the loss of sound when a record-player skips a track on a phonograph record, in pictures and sound occurs. However, even if an error occurs in retrieving data in response to a read command, the HDD in the continuous mode does not stop reading data from a magnetic-recording disk or transferring the data read to perform the ERP. Rather, the data read from the magnetic recording disk is transferred without delay to the host, which effectively prevents interruptions in the flow of video and audio information, which is a highly desirable feature for AV equipment.

In accordance with embodiments of the present invention, on the other hand, an error may lead to a failure of an entire AV device if error data is read from a system area in a read operation or is written to a system area in a write operation. Therefore, if an error occurs during a read or write operation of a system area, an HDD carries out an ERP responsive to the error to read or write correct data. Thus, a host generally does not designate the continuous mode. Under different circumstances, the host in an AV device may instruct an HDD to use a mode with an ERP for a video and audio data write operation. Hence, if an error occurs in a video and audio data write operation, the HDD performs the ERP.

In accordance with embodiments of the present invention, an HDD may carry out the ERP according to a table storing error recovery operations. As the HDD carries out the operations to recover from the error, a substantial amount of time may be taken to execute ineffective operations for the error recovery. Consequently, the transfer rate for data between the HDD in the host may not be satisfied. For example, the HDD may receive a read command of the continuous mode while it is performing an ERP during a write operation. The read command of the continuous mode has to wait for completion of the ERP of the write command to end before commencing. If the ERP takes a substantial amount of time, the processing of the read command of the continuous mode is delayed; and, the video and audio content a user is receiving may come to a halt. Accordingly, embodiments of the present invention prevent a delay in the transfer of read data caused by processing another command.

In one embodiment of the present invention, a method for an ERP in a disk-drive device is subsequently presented. The method includes starting the ERP in response to an error which has occurred in a process corresponding to a command from a host to access a disk. In addition, the method includes receiving a new read command from the host during the ERP. The method also includes interrupting the ERP in accordance with preset conditions and reading out data from the disk at the address designated by the read command. The method includes transferring the read-out data to the host. Thus, the method can suppress a transfer delay of read data.

In another embodiment of the present invention, the ERP sequentially carries out error recovery operations stored in a table; and, the ERP is interrupted between two error recovery operations. Thus, the ERP is not interrupted and the reduction in the overall process efficiency is averted.

In one embodiment of the present invention, the method further includes referring to a command type of the received read command, and determining whether to interrupt the ERP or not based on the command type. Thus, the delay of the command to avoid the transfer delay may be averted and the reduction in the process efficiency due to the interruption of the ERP is averted.

In another embodiment of the present invention, conditions to interrupt the ERP include a condition that an available buffer space for read data is sufficient for the data of the read command. Thus, the reduction in the process efficiency due to the useless interruption is averted.

In one embodiment of the present invention, the ERP sequentially carries out error recovery operations stored in a table; and, the method further includes determining whether to interrupt the ERP or not based on the process details of a next error recovery operation. Thus the error recovery rate may be raised when the interruption is carried out. Moreover, in another embodiment of the present invention, conditions not to interrupt the ERP include a condition that the next error recovery operation attempts to write data while continuing to follow the target track of and immediately preceding ERP operation. These operations may make it possible for error recovery in successive processing.

In another embodiment of the present invention, the method further includes referring to a command type of the ERP and determining whether to interrupt the ERP or not based on the command type. Thus, the ERP of the command with higher priority may be completed sooner.

In another embodiment of the present invention, the ERP sequentially carries out error recovery operations stored in a table; and, the method further includes determining whether to interrupt the ERP or not based on a number of performed error recovery operations. Thus, it may make it possible for error recovery to occur while suppressing a delay in data transfer.

In one embodiment of the present invention, the method further includes determining whether to interrupt the ERP or not based on remaining time before time-out of a command of the ERP. Thus, it may avoid the time-out more reliably.

In another embodiment of the present invention, a command of the ERP is a write command; and, the method further includes determining whether to interrupt the ERP or not based on an available buffer space for data selected from the group consisting of write data and read data. Thus, the reduction in process efficiency due to useless interruption is averted.

In accordance with embodiments of the present invention, a disk-drive device includes a motor for spinning a data storage disk, a head for accessing the disk, a moving mechanism for supporting the head and moving the head along a radial direction of the disk and a controller. In accordance with an embodiment of the present invention, the controller is configured to interrupt an ERP in accordance with preset conditions, to read out data from the disk at an address designated by a new read command and to transfer the read-out data to the host if the read command is received from the host during the ERP to an error which has occurred in a process corresponding to a command from the host to access the disk. Thus, it may suppress a transfer delay of read data. Thus, in accordance with embodiments of the present invention, a transfer delay of read data to a host may be prevented. Hereinafter, descriptions will be given to a hard-disk drive (HDD) as an example of a disk-drive device.

In accordance with embodiments of the present invention, a HDD, in accordance with specific conditions, interrupts the ERP in a process for a command to access the magnetic-recording disk, for example, a read command or a write command, and then reads out the data at the address designated by a read command received in the middle of the ERP and sends the data to a host. Thus, interrupting the ERP prevents a transfer delay of the read data designated by the read command to the host. After the read data transfer, the HDD resumes the interrupted ERP. Before describing details of the ERP, the configuration of the HDD is next described.

Figure 1:
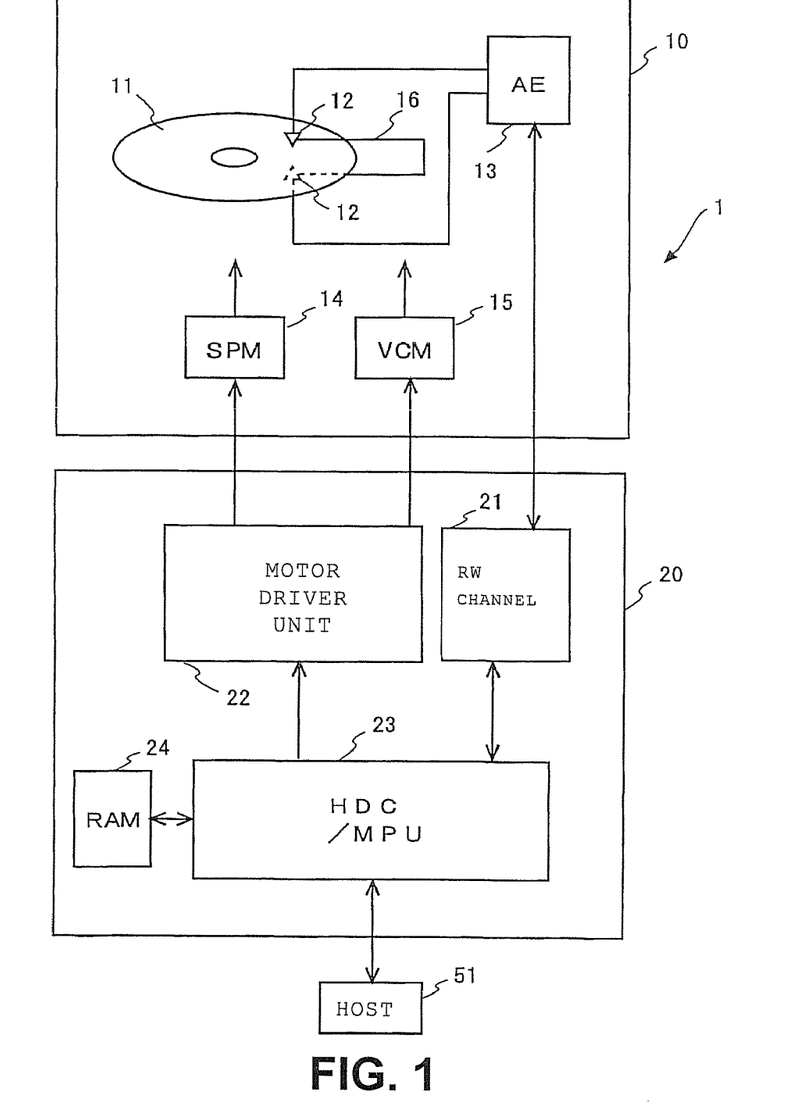
FIG. 1 is an example block diagram schematically depicting the configuration of a hard-disk drive, in accordance with an embodiment of the present invention.

With reference now to FIG. 1, in accordance with an embodiment of the present invention, a block diagram is shown. FIG. 1 shows the configuration of HDD 1. The HDD 1 includes a circuit board 20 fixed outside of an enclosure 10. On the circuit board 20, circuits such as a read and write channel (RW channel) 21, a motor driver unit 22, an integrated circuit (HDC/MPU) 23 of a hard-disk controller (HDC) and a microprocessor unit (MPU), a random access memory (RAM) 24 of a semiconductor memory are arranged. In enclosure 10, a spindle motor (SPM) 14 spins a magnetic-recording disk 11 at a specific angular rate. The magnetic-recording disk 11 is a disc for storing data. The motor driver unit 22 drives the SPM 14 according to control data from the HDC/MPU 23. Head sliders 12 to access the magnetic-recording disk 11, for example, to read or write data, each include a slider for flying over the magnetic-recording disk 11 and a head element portion, which is secured to the slider, that converts magnetic signals that are read from the magnetic-recording disk 11 into electronic signals that provide the read-out data, and that converts electronic signals into magnetic signals that are written to the magnetic-recording disk 11 that provide the written data on the disk. The head sliders 12 are secured at the distal end of an actuator 16. The actuator 16 is connected to a voice coil motor (VCM) 15 and rotates on a pivot shaft to move the head sliders 12 above the spinning magnetic-recording disk 11 along a radial direction. A motor driver unit 22 drives the VCM 15 according to the control data from the HDC/MPU 23. An arm electronics (AE) module 13 selects a head slider 12 to access the magnetic-recording disk 11, for example, in reading or writing data, from a plurality of head sliders 12 according to the control data from the HDC/MPU 23 and amplifies read or write signals.

With further reference to FIG. 1, in accordance with an embodiment of the present invention, the RW channel 21, in a read operation, extracts servo data and user data from the read signals obtained from the AE module 13 and decodes them. The decoded data are supplied to the HDC/MPU 23. The RW channel 21, in a write operation, code-modulates the write data supplied from the HDC/MPU 23, converts the code-modulated data into write signals, and then supplies them to the AE module 13. In the HDC/MPU 23, the HDC includes a logic circuit and the MPU works according to firmware loaded into the RAM 24. The HDC/MPU 23 is an example of a controller and acts to control the HDD 1 and processes associated with data processing, such as: head positioning control, interface control, and data error management. In accordance with embodiments of the present invention, the HDC/MPU 23 participates in executing control of the read ERP and the write ERP. Moreover, in accordance with embodiments of the present invention, the HDC/MPU 23, in accordance with specific conditions, interrupts an active ERP of a read operation, or alternatively a write operation, and starts the process for a read command received during the ERP. Thus, the HDC/MPU 23 may transfer read data requiring a prompt transfer to the host 51 without delay. In AV equipment, for example, the host 51 is a main controller in the equipment. In one embodiment of the present invention, there exist conditions in accordance with which the HDC/MPU 23 interrupts an ERP. As used herein, the term of art "read command" includes different types of read command; and, the term of art "write command" includes different types of write command. Moreover, as used herein, the term of art "command type" includes command types for both the read command and the write command.

With further reference to FIG. 1, in accordance with an embodiment of the present invention, interrupting an ERP on every occasion in response to receiving a read command during the ERP results in interrupting the active process for a slower read data transfer, or interrupting the active process even if the ERP takes precedence over the read data transfer in view of other conditions, which reduce the processing efficiency of the HDD 1 considerably. Therefore, the HDC/MPU 23 interrupts an ERP if preset conditions are satisfied. There is a plurality of specific condition items, upon which the HDC/MPU 23 determines whether to interrupt an ERP. The HDD 1 selects one of the condition items or links some of the condition items so that it may carry out processes appropriate for the device where it is installed. The condition items of the ERP interruption include items, such as: the command type of the received read command; the command to which the running ERP corresponds; or the remaining time before the timeout of the command; the state of the running ERP such as the next ERP operation; a number of ERP operations carried out; and, the state of a buffer. The HDC/MPU 23 makes a determination regarding one or more preset ERP interruption condition items and interrupts the ERP if all the condition items are satisfied. Hereinafter, specific condition items are explained. The design of the HDD 1 may use each item independently or select proper combinations.

With further reference to FIG. 1, in accordance with an embodiment of the present invention, there exists a plurality of combinations of the condition items. First, a process will be described which interrupts a write ERP for a specific read command received during a write ERP. An example of such a specific read command is a read command designating the continuous mode. This read command is one of streaming commands useful for AV data. In the continuous mode, the HDC/MPU 23 neglects errors occurring in a read operation, and reads out read data from the magnetic-recording disk 11 and transfers the read-out data to the host 51 without carrying out ERPs.

Figure 2:
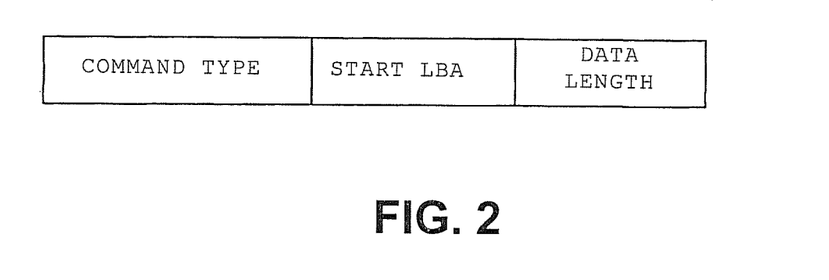
FIG. 2 illustrates an example format of a streaming command, in accordance with an embodiment of the present invention.

With reference now to FIG. 2, in accordance with an embodiment of the present invention, an example of the format of a read streaming command is shown. The read command contains fields which indicate the command type indicating the kind of the command, the start logical block address (LBA) that is a start address to read out data and the data length, respectively. The HDC/MPU 23 refers to the command type to determine whether the read command designates the continuous mode or not. If the data specified by the read command is present in a cache, the HDC/MPU 23 carries out the transfer of the read data to the host 51 and concurrently executes an ERP without interrupting the ERP. The HDC/MPU 23 may transfer the data in the buffer for a cache hit, so the HDC/MPU 23 does not need to access the magnetic-recording disk 11 and may perform the write ERP and the read data transfer concurrently.

In accordance with an embodiment of the present invention, the HDC/MPU 23 performs a write ERP according to a write ERP table. The write ERP table consists of a plurality of write ERP operations for error recovery. The HDC/MPU 23 executes operations stored in the write ERP table in order of precedence. In accordance with one embodiment of the present invention, the HDC/MPU 23 does not interrupt the process in the middle of a write ERP operation, but the HDC/MPU 23 interrupts the write ERP between write ERP operations. The host 51 has a buffer and HDC/MPU 23 has time which is allocated to complete a read data transfer. Therefore, in one embodiment of the present invention, completion of running the ERP operation raises the recovery rate of write errors to avoid the a reduction of the overall process efficiency.

In another embodiment of the present invention, the HDC/MPU 23 determines whether to interrupt the write ERP or not based on the process details of the next write ERP operation. If the next write ERP operation is a specific write ERP operation, the HDC/MPU 23 carries out the next write ERP operation without interrupting the write ERP. For example, there are some write ERP operations that are performed successively. As used herein, the term of art "successively" may also mean "sequentially." The HDC/MPU 23 gives a higher priority to such predetermined specific write ERP operations than a new read command in the execution sequence, which raises the error recovery rate from write errors to avoid an overall process efficiency reduction of the HDD 1.

Figure 3:
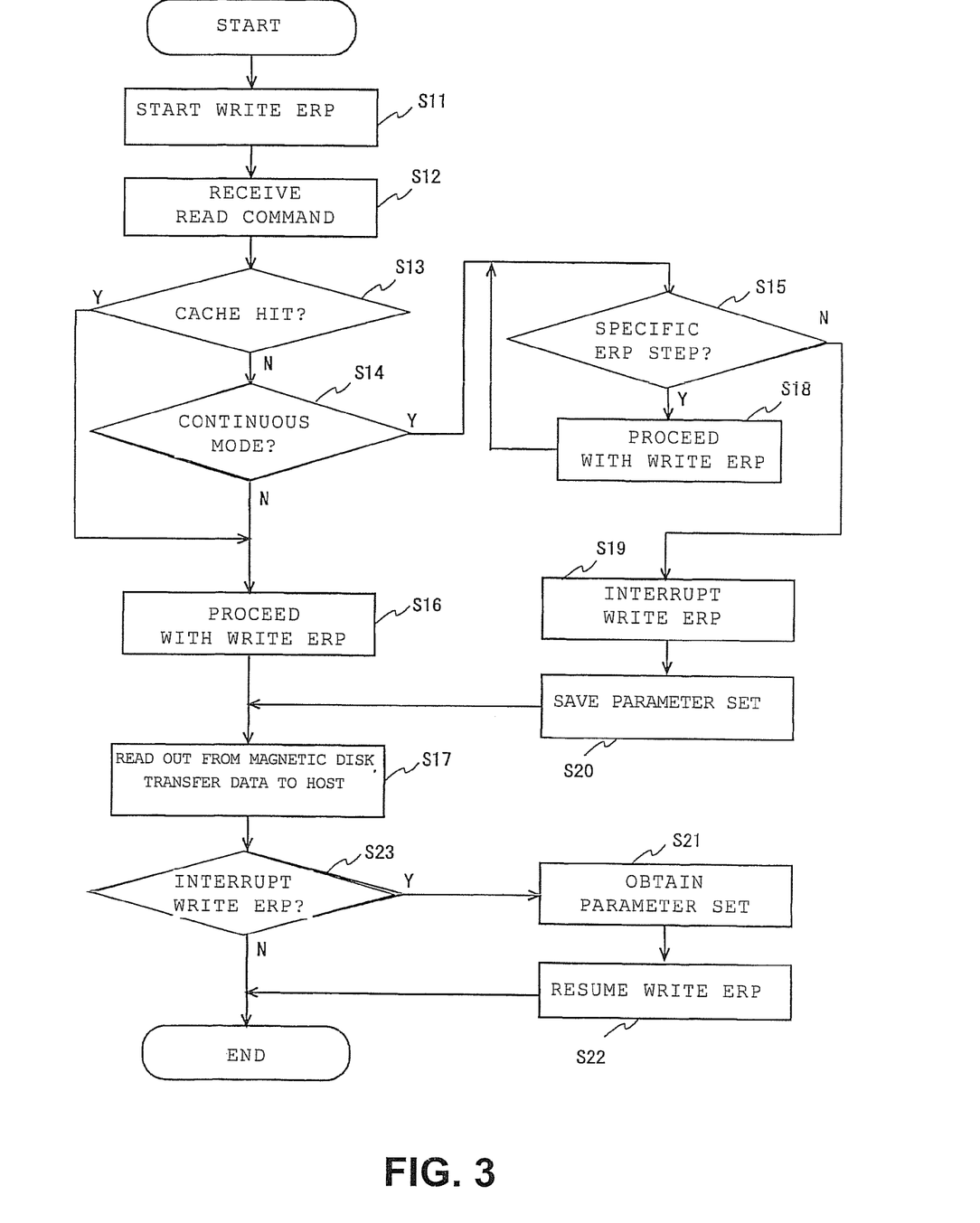
FIG. 3 is an example flowchart of the process of interrupting a write error recovery process (ERP), in accordance with an embodiment of the present invention.
Figure 4:
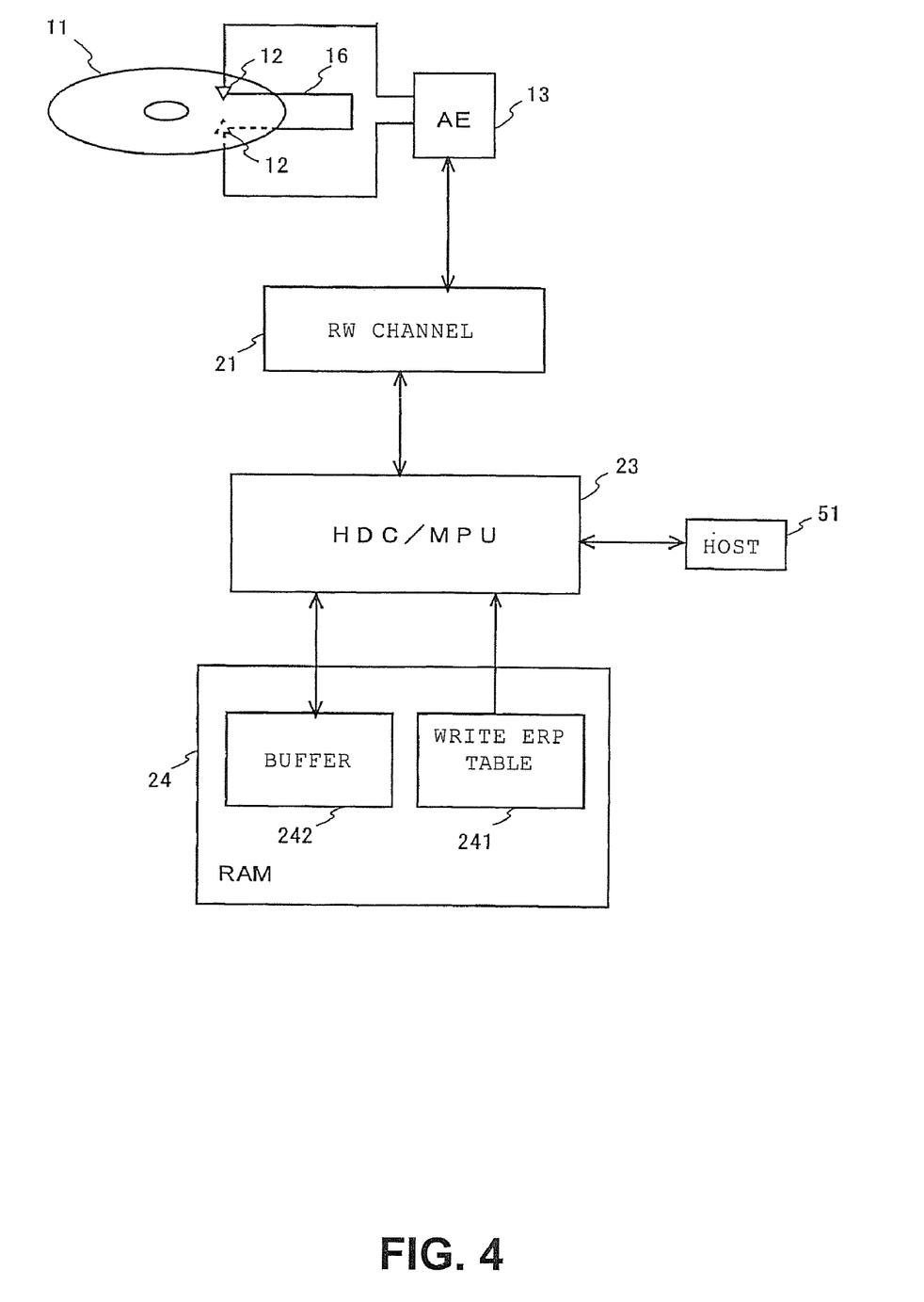
FIG. 4 is an example block diagram schematically showing components associated with execution of a write ERP, in accordance with an embodiment of the present invention.

With reference now to FIGS. 3 and 4, in accordance with an embodiment of the present invention, the flow of a process performing a write ERP based on the above conditions, for example, an interruption of the ERP, is next described referring to the flowchart of FIG. 3 and the block diagram of FIG. 4. The HDC/MPU 23 writes data to the magnetic-recording disk 11 in accordance with a write command from the host 51. The write cache function is enabled and the HDC/MPU 23 stores the write data from the host 51 in a buffer 242 in the RAM 24 and then provides the host 51 with a notification of the write completion. If an error occurs in the write operation, the HDC/MPU 23 starts the write ERP (S11). The HDC/MPU 23 refers the write ERP table 241 in the RAM 24 and executes operations in order of precedence. If the HDC/MPU 23 receives a read command from the host 51 in the middle of carrying out the write ERP (S12), the HDC/MPU 23 makes a determination when the cache hit of the read data occurs. If the read data is in the cache (Y in S13), the HDC/MPU 23 proceeds with the write ERP without interrupting the write ERP (S16). The HDC/MPU 23 transfers the data in the buffer to the host 51 concurrently with the write ERP.

With further reference to FIGS. 3 and 4, in accordance with an embodiment of the present invention, if the read data is not in the cache (N in S13), the HDC/MPU 23 identifies the command type (S14). As described referring to FIG. 2, the HDC/MPU 23 may identify the command type by referring to the field in the command. If the received read command is not a read command of the read continuous mode (N in S14), the HDC/MPU 23 proceeds with the write ERP without interrupting the write ERP (S16). The HDC/MPU 23 reads out the data from the magnetic-recording disk 11 according to the read command after completing the write ERP (S17). If the received read command is a read command of the read continuous mode (Y in S14), the HDC/MPU 23 completes running the write ERP operation and then determines whether the next write ERP operation is a operation for proceeding with the write ERP (S15). One or more specific ERP operations for continuing the write ERP are predetermined and the HDC/MPU 23 determines whether the next ERP operation belongs to the group of ERP continuing operations.

With further reference to FIGS. 3 and 4, in accordance with an embodiment of the present invention, if the next write ERP operation is the specific ERP operation (Y in S15), the HDC/MPU 23 starts execution of the write ERP operation without interrupting the write ERP (S18). If the write ERP operation comes to an end, the HDC/MPU 23 returns to the operation (S15) and repeats the same operations. If the next write ERP operation is not the specific ERP operation (Y in S15), the HDC/MPU 23 interrupts the write ERP (S19) and stores parameters in the RAM 24 (S20). Specifically, the parameter set to be saved to the RAM 24 includes parameters of the RW channel 21, the addresses that the write command designates, the information identifying the last executed write ERP operation and so on. Then, the HDC/MPU 23 reads out the data corresponding to the received read command and transfers them to the host 51 (S17). If the operation to the read command comes to an end (S17), as the write ERP remains interrupted (Y in S23), the HDC/MPU 23 obtains the parameter set of the write ERP from the RAM 24 (S21) and resumes the interrupted write ERP (S22). Namely, the HDC/MPU 23 resumes the write ERP from the next operation to the last completed write ERP operation. In this way, the HDC/MPU 23 resumes the write ERP from the interruption point, because it may repeat the same operations and take time to recover from the error if it resumes the write ERP from the beginning.

With further reference to FIGS. 3 and 4, in accordance with an embodiment of the present invention, write ERP operations for which the write ERP proceeds and which are used as condition items for the interruption of the write ERP in the above process flow are next described in greater detail. Typically, some of ERP operations carried out in a write ERP have different process details and some of them are the same operations. For example, a write ERP table has five different write ERP operations and the five write ERP operations are stored to be carried out twice each. Namely, the write ERP table stores a total of ten write ERP operations. Practical write ERP operations vary depending on the design of HDD. An example write ERP operation resets the parameters of the RW channel 21 and attempts to write data. Another write ERP operation performs a seek process to a data track which has the same track number, for example, given by a cylinder number, as the target track but is on a different recording surface, for example, corresponding to a given head slider, and then performs a re-seek process to the target track and attempts to write data. A write ERP table may store no other write ERP operations with the same process details as a given write ERP operation or may store some write ERP operations the same as the given write ERP operation. If some write ERP operations with the same process details are stored, these write ERP operations may be successive or dispersed in the write ERP table.

With further reference to FIGS. 3 and 4, in accordance with an embodiment of the present invention, some of various write ERP operations may raise the error recovery rate if they are performed successively. These write ERP operations are processes which attempt to write data while continuing to follow the target track, in other words, without moving to another track. For example, these write ERP operations are a group of successive write ERP operations with the same process details which attempt to write data while continuing to follow the target track. In performing such a plurality of operations, attempts are made to write data repeatedly while continuing to follow the target track without a seek process. Namely, if the next write ERP operation has the same process details as the immediately preceding ERP operation and continues to follow the target track, the HDC/MPU 23 carries out the next write ERP operation successively. Since an interruption of the write ERP is accompanied by a seek process, when the HDC/MPU 23 is carrying out such a operation, the HDC/MPU 23 proceeds with the write ERP without interrupting it. In one embodiment of the present invention, such write ERP operations are: an operation that performs target track following, or attempts to do so, and data writing even if the burst in a servo sector is not detected; an operation that attempts target track following and data writing while changing the RW channel 21 parameters for servo detection; an operation that attempts target track following and data writing even if the gray code, associated with the servo track identification (ID) given by the servo cylinder ID, may not be read; an operation that attempts target track following and data writing even if the sector number can not be read; and so on. Operations which change the RW channel 21 parameters and attempt to write data have the same process details though the settings of the HDD 1 are different in the operations.

With further reference to FIGS. 3 and 4, in accordance with an embodiment of the present invention, a plurality of servo tracks are formed on the magnetic-recording disk 11 continuously in the radial direction. Each servo track consists of servo sectors separated in the circumferential direction. User data are recorded in data sectors between servo sectors. Each servo sector contains the servo track ID, given by the servo cylinder ID, formed of the gray code identifying the servo track, the sector number identifying the servo sector and the burst pattern locating the precise position in the servo track. In accordance with one embodiment of the present invention, the HDC/MPU 23 repeats each of the above write ERP operations several times. If the first write ERP operation to start after receiving a read command occurs a second time, or after, the write ERP operations, the HDC/MPU 23 starts the operation without interrupting the write ERP. If the first write ERP operation to start after receiving a read command is different from the above write ERP operations, or is one of the above write ERP operations, and the first operation of successive operations, the HDC/MPU 23 interrupts the write ERP and carries out the process for the read command.

With further reference to FIGS. 3 and 4, in accordance with an embodiment of the present invention, on the other hand, one of the operations which interrupts the write ERP without starting the operation when a read command is received is, for example, an operation which performs a seek process of a track with the same track number, given by the cylinder number, as the target track and a different recording surface, corresponding to a different head slider, from the target track and then performs a re-seek process to the target track to attempt writing. The operation includes the seek process and it is not necessary to perform the operation and the immediately preceding operation successively. Another one is an operation which corrects errors in write data received from the host. The operation does not relate to the data writing to a disk and it is not necessary to perform the operation and the immediately preceding operation successively. In addition, another of the operations that interrupts the write ERP is an operation which carries out a seek process to another track for a dummy write and then attempts to write data on the target track.

With further reference to FIGS. 3 and 4, in accordance with an embodiment of the present invention, the example described for the flow chart of FIG. 3 makes a determination on the interruption, or continuation, of the write ERP based on the write ERP operation to be performed next. The HDC/MPU 23 may make a determination on the interruption, or continuation, based on another write ERP condition item different from the write ERP condition item or based on another write ERP condition item in addition to the write ERP condition item. In the example, the HDC/MPU 23 makes a determination on the interruption, or continuation, of the write ERP based on a number of performed write ERP operations in addition to the above condition items. One condition item is that the number of performed write ERP operations has reached the preset specific number. Specifically, the HDC/MPU 23 continues the write ERP until completing the specific number of write ERP operations with higher priority and interrupts the write ERP after completing the specific number of write ERP operations. Thus, it advances the recovery from a write error and reduces the possibility of data lost by power shut down. For example, the HDC/MPU 23 does not interrupt the write ERP until completing the tenth write ERP operation even if it receives a read command of the continuous mode. An appropriate number is selected as the specific number in the design in view of the error recovery rate and set in the firmware of the HDC/MPU 23.

With further reference to FIGS. 3 and 4, in accordance with an embodiment of the present invention, in a specific process, for example, the HDC/MPU 23, in the flow chart of FIG. 3, refers to the operation number of the write ERP operation performed last and determines whether the number has reached a specific number before making a determination on the details, given by the type, of the next write ERP operation (S15). If the operation number has not reached the specific number, the HDC/MPU 23 carries out the next write ERP operation without making a determination on the next write ERP operation (S15). If the operation number has reached the specific number, the HDC/MPU 23 makes a determination on the next write ERP operation (S15). If the HDC/MPU 23 uses the operation number of the next write ERP operation for the determination on the number of performed write ERP operations, it determines whether the operation number has reached the value obtained by adding 1 to the specific number.

With further reference to FIGS. 3 and 4, in accordance with another embodiment of the present invention, another condition item is the command type of the write command to which the running write ERP corresponds. The HDC/MPU 23 changes the interruption process of the write ERP in accordance with the command type of the write command. For example, the HDC/MPU 23 interrupts the write ERP only if the write command is a specific type, and if the write command is another type, the HDC/MPU 23 proceeds with the write ERP without interrupting the write ERP even if the HDC/MPU 23 receives another read command. In another embodiment of the present invention, the host 51 uses a streaming command for reading, or writing, AV data, and a non streaming command for system data, for example, data for the system control other than AV data. The HDC/MPU 23 interrupts the write ERP only if the command type of the write command is the streaming command.

With further reference to FIGS. 3 and 4, in accordance with another embodiment of the present invention, for the example described for FIG. 3, the HDC/MPU 23 performs the process in accordance with the flowchart in FIG. 3 if the running write ERP is a write ERP for a streaming command, and the HDC/MPU 23 proceeds with the write ERP without starting the process in accordance with the flowchart in FIG. 3 if the running write ERP is a write ERP for a non streaming command, for example, a WRITE DMA command. Thus, the process may reduce the risk that data fails to be written because of a power shutdown.

With further reference to FIGS. 3 and 4, in accordance with another embodiment of the present invention, as described above, interruption conditions of a write ERP include conditions regarding the received read command in addition to conditions regarding the write ERP. In the process described for FIG. 3, the HDC/MPU 23 interrupts the write ERP if a read streaming command is of the continuous mode. Not interrupting the write ERP for all read commands, but interrupting the write ERP for commands, which need the prevention of the transfer delay, suppresses reduced processing efficiency while avoiding the transfer delay of the read data. Depending on the design, the HDC/MPU 23 may perform the process in accordance with the flow chart of FIG. 3 if it receives any read command. The condition items associated with the read command include: the available buffer space for read data, and the command type of the read command. The HDC/MPU 23 stores read data received from the host 51 in the buffer 242 in the RAM 24 temporarily. If the available buffer space for read data is smaller than the data length, the HDC/MPU 23 can not receive the read data, and interruption of the write ERP is without effect. If the HDC/MPU 23 receives a read command, it compares the data length of the designated address with the available buffer space. If the data length is no more than the available buffer space, the HDC/MPU 23 makes a determination on the interruption of the write ERP. For example, the HDC/MPU 23 makes a determination on the relation between the data length and the available buffer space before starting the process of the flowchart in FIG. 3. If the data length is no more than the available space, the HDC/MPU 23 starts the process of the flowchart of FIG. 3. If the data length is more than the available buffer space, the HDC/MPU 23 proceeds with the write ERP. The HDD 1 may store read data and write data in the same buffer, for example, a single buffer, or store read data and write data in different buffers, for example, dual buffers. The buffer is typically a ring buffer. The HDC/MPU 23 may use the amount of write data in the buffer as a condition item for the interruption of the write ERP. A large amount of write data stored in a single buffer results in little available space for read data. If a large amount of write data is stored in a dual buffer, the dual buffer can not receive new write data and makes the host 51 wait. Therefore, in one embodiment of the present invention, the HDC/MPU 23 determines whether to interrupt the write ERP or not using the quantity of write data in a buffer. For example, if the quantity of write data in the buffer is over a specific amount, the HDC/MPU 23 continues the write ERP. If the quantity of write data in the buffer is not over the specific amount, the HDC/MPU 23 starts the process of the flowchart of FIG. 3.

With further reference to FIGS. 3 and 4, in accordance with another embodiment of the present invention, for the processes described above, the write cache function is provided in the HDD 1. Thus, the HDC/MPU 23 may receive the next command while executing a write command. In addition, the present invention may be applied to the HDD 1 supporting command queuing. The HDC/MPU 23 may receive the next command from the host 51 before completing a read command and a write command by the command queuing. Under these conditions, the HDD 1 may interrupt a read ERP on specific conditions in addition to a write ERP. In one embodiment of the present invention, if the HDC/MPU 23 receives a read streaming command of continuous mode in the middle of a read ERP for a non streaming command, for example, a READ DMA command, it interrupts the read ERP on specific conditions and executes the received new read command. The condition items for the read ERP interruption, similar to the condition items for the write ERP interruption up, includes items, such as: the command type of the received read command; the command to which the running ERP corresponds, or the remaining time before the time-out of the command; the state of the running ERP, such as the next ERP operation; the number of ERP operations carried out; and, the state of a buffer. In addition, if a timeout is set by the host 51, the HDC/MPU 23 uses the timeout as a condition item for the ERP interruption. The HDC/MPU 23 must complete a command process before a specific time has elapsed, for example, before a timeout has occurred. In this regard, if the remaining time before the timeout occurs is short, the HDC/MPU 23 proceeds with the ERP without interrupting it. For example, if the remaining time before the timeout occurs for the command for the running ERP is less than a set value, the HDC/MPU 23 proceeds with the ERP without interrupting the ERP even if other conditions are satisfied. Thus, the HDC/MPU 23 may avert the timeout of the running command by executing another command.

As set forth above, certain embodiments of the present invention have been described, but the above-described embodiments of the present invention are by way of example and not limitation thereto and may of course be modified in various ways without departing from the spirit and scope of embodiments of the present invention. For example, the embodiments of the present invention may be applied to a disk-drive device using a different type of disk from a magnetic-recording disk, such as: an optical disk, a magneto-optical disk, or a detachable disk, as may be employed in various types of disk-drive devices.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for an error recovery process in a disk-drive device, said method comprising:
   starting said error recovery process in response to an error which has occurred in a process corresponding to a command from a host to access a disk;
   receiving a new read command from said host during said error recovery process;
   interrupting said error recovery process in accordance with preset conditions and reading out data from said disk at an address designated by said read command; and
   transferring said read-out data to said host,
   determining whether to interrupt said error recovery process based on process details of a next error recovery operation; wherein said error recovery process sequentially carries out error recovery operations stored in a table, wherein conditions not to interrupt said error recovery process comprise a condition that said next error recovery operation attempts to write data while continuing to follow a target track of an immediately preceding error recovery process operation.

2. The method recited in claim 1, wherein
   said error recovery process sequentially carries out error recovery operations stored in a table; and
   said error recovery process has been interrupted between two error recovery operations.

3. The method recited in claim 1, said method further comprising:
   referring to a command type of said received read command; and
   determining whether to interrupt said error recovery process based on said command type.

4. The method recited in claim 1, wherein conditions to interrupt said error recovery process comprise a condition that an available buffer space for read data is sufficient for said data of said read command.

5. The method recited in claim 1, said method further comprising:
   referring to a command type of said error recovery process; and
   determining whether to interrupt said error recovery process based on said command type.

6. The method recited in claim 1, said method further comprising:
   determining whether to interrupt said error recovery process based on a number of performed error recovery operations;
   wherein said error recovery process sequentially carries out error recovery operations stored in a table.

7. The method recited in claim 1, said method further comprising:
   determining whether to interrupt said error recovery process based on remaining time before time-out of a command of said error recovery process.

8. The method recited in claim 1, said method further comprising:
   determining whether to interrupt said error recovery process based on an available buffer space for data selected from the group consisting of write data and read data;
   wherein a command of said error recovery process is a write command.

9. A disk-drive device comprising:
   a motor for spinning a data storage disk;
   a head for accessing said disk;
   a moving mechanism for supporting said head and moving said head along a radial direction of said disk; and a controller, said controller configured to interrupt an error recovery process in accordance with preset conditions, to read out data from said disk at an address designated by a new read command and to transfer said read-out data to a host if said read command is received from said host during said error recovery process in response to an error which has occurred in a process corresponding to a command from said host to access said disk, wherein said controller is configured to sequentially carry out error recovery operations of said error recovery process stored in a table and to determine whether to interrupt said error recovery process based on process details of a next error recovery operation, wherein conditions not to interrupt said error recovery process comprise a condition that said next error recovery operation attempts to write data while continuing to follow a target track of an immediately preceding error recovery process operation.

10. The disk-drive device of claim 9, wherein said controller is configured to sequentially carry out a plurality of error recovery operations of said error recovery process stored in a table and to interrupt said error recovery process between two error recovery operations.

11. The disk-drive device of claim 9, wherein said controller is configured to refer to a command type of said received read command and to determine whether to interrupt said error recovery process based on said command type.

12. The disk-drive device of claim 9, wherein conditions to interrupt said error recovery process comprise a condition that an available buffer space for read data is sufficient for said data of said read command.

13. The disk-drive device of claim 9, wherein said controller is configured to refer to a command type of said error recovery process and to determine whether to interrupt said error recovery process based on said command type.

14. The disk-drive device of claim 9, wherein said controller is configured to sequentially carry out error recovery operations of said error recovery process stored in a table and to determine whether to interrupt said error recovery process based on a number of performed error recovery operations.

15. The disk-drive device of claim 9, wherein said controller is configured to determine whether to interrupt said error recovery process based on remaining time before time-out of a command of said error recovery process.

16. The disk-drive device of claim 9, wherein
a command of said error recovery process is a write command, and
said controller is configured to determine whether to interrupt said error recovery process based on an available buffer space for data selected from the group consisting of write data and read data.

* * * * *